(12) United States Patent
Mueller et al.

(10) Patent No.: US 10,036,423 B2
(45) Date of Patent: Jul. 31, 2018

(54) CAGE FOR DOUBLE-ROW SPHERICAL BEARING

(71) Applicant: FORUM US, INC., Houston, TX (US)

(72) Inventors: Keith Mueller, Flint, TX (US); Jesse Nokes, Houston, TX (US)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 15/183,875

(22) Filed: Jun. 16, 2016

(65) Prior Publication Data

US 2016/0377120 A1    Dec. 29, 2016

Related U.S. Application Data

(60) Provisional application No. 62/184,983, filed on Jun. 26, 2015.

(51) Int. Cl.
| | | |
|---|---|---|
| *F16C 33/52* | (2006.01) | |
| *F16C 33/48* | (2006.01) | |
| *F16C 19/38* | (2006.01) | |
| *F16C 23/08* | (2006.01) | |

(52) U.S. Cl.
CPC .......... *F16C 33/523* (2013.01); *F16C 23/086* (2013.01); *F16C 33/485* (2013.01); *F16C 19/38* (2013.01)

(58) Field of Classification Search
CPC ...... F16C 19/38; F16C 23/086; F16C 33/485; F16C 33/523; F16C 33/526; F16C 33/585
USPC ....... 384/523, 548, 560, 564–565, 568, 574, 384/621, 623
See application file for complete search history.

(56) References Cited

U.S. PATENT DOCUMENTS

| | | | |
|---|---|---|---|
| 574,988 A | * | 1/1897 | Ferrall ................ F16C 33/3706 |
| | | | 384/551 |
| 890,106 A | | 6/1908 | Tschantz |
| 1,018,324 A | * | 2/1912 | Kempster ............... F16C 19/26 |
| | | | 29/898.061 |
| 1,144,484 A | | 6/1915 | Lockwood |
| 1,270,820 A | | 7/1918 | Hart |
| 1,283,713 A | | 11/1918 | Fjellman |
| 1,616,828 A | | 2/1927 | Runge |
| 1,617,613 A | | 2/1927 | Wells |
| 1,790,869 A | | 2/1931 | Leon |
| 1,884,925 A | | 10/1932 | Vanderbeek |

(Continued)

FOREIGN PATENT DOCUMENTS

| | | |
|---|---|---|
| CN | 202545566 U | 11/2012 |
| DE | 521075 C | 3/1931 |

(Continued)

OTHER PUBLICATIONS

International Search Report and Written Opinion dated Sep. 13, 2016, corresponding to Application No. PCT/US2016/037758.

*Primary Examiner* — Marcus Charles
(74) *Attorney, Agent, or Firm* — Patterson + Sheridan, L.L.P.

(57) ABSTRACT

A roller bearing comprising an inner ring, an outer ring, and a bearing cage positioned between the inner ring and the outer ring. The bearing cage includes a spine and a plurality of pins disposed one side of the spine that are coplanar or offset with a plurality of pins disposed on an opposite side of the spine. A roller is rotationally coupled to each pin such that each roller is coplanar or offset with another roller on the opposite side of the spine.

17 Claims, 15 Drawing Sheets

(56) References Cited

U.S. PATENT DOCUMENTS

| | | | | |
|---|---|---|---|---|
| 2,016,526 A * | 10/1935 | Tyson | ............ | F16C 19/385 |
| | | | | 29/898.061 |
| 2,561,105 A * | 7/1951 | Forkey | ............ | F16C 19/26 |
| | | | | 384/568 |
| 2,622,947 A | 12/1952 | Wallgren | | |
| 2,989,353 A | 6/1961 | Nyberg | | |
| 3,667,821 A * | 6/1972 | Rader | ............ | F16C 23/086 |
| | | | | 384/574 |
| 3,707,315 A | 12/1972 | Goodfellow | | |
| 3,884,312 A | 5/1975 | Williams | | |
| 4,084,649 A | 4/1978 | van Nederveen | | |
| 4,406,333 A | 9/1983 | Adams | | |
| 5,256,495 A | 10/1993 | Holtz et al. | | |
| 5,269,609 A | 12/1993 | Holtz et al. | | |
| 5,290,374 A | 3/1994 | Holtz et al. | | |
| 5,507,355 A | 4/1996 | Mattsson | | |
| 5,577,565 A | 11/1996 | Kocab et al. | | |
| 5,582,483 A | 12/1996 | Grunze et al. | | |
| 6,247,847 B1 * | 6/2001 | Lob | ............ | F16C 19/26 |
| | | | | 384/51 |
| 6,464,062 B1 * | 10/2002 | Wendt | ............ | B65G 59/04 |
| | | | | 193/35 R |
| 6,708,786 B2 | 3/2004 | Cariveau et al. | | |
| 7,168,546 B2 * | 1/2007 | Plesh, Sr. | ............ | B21B 43/04 |
| | | | | 193/35 R |
| 7,338,213 B2 * | 3/2008 | Schroder | ............ | F16C 23/086 |
| | | | | 384/558 |
| 7,798,254 B2 | 9/2010 | Peterson et al. | | |
| 8,277,127 B2 * | 10/2012 | Messerschmidt | ............ | F16C 19/364 |
| | | | | 384/470 |
| 2007/0189651 A1 | 8/2007 | Haepp | | |
| 2007/0189652 A1 | 8/2007 | Schroeder et al. | | |
| 2013/0092448 A1 | 4/2013 | Martin | | |
| 2014/0169717 A1 * | 6/2014 | Schroder | ............ | F16C 23/086 |
| | | | | 384/475 |

FOREIGN PATENT DOCUMENTS

| | | | | |
|---|---|---|---|---|
| DE | 102004013542 A1 * | 10/2005 | ............ | F16C 23/086 |
| DE | 102007011532 A1 | 9/2008 | | |
| JP | H08326759 A | 12/1996 | | |
| JP | 2001165173 A | 6/2001 | | |

* cited by examiner

CAGE FOR DOUBLE-ROW SPHERICAL BEARING

CROSS-REFERENCE TO RELATED APPLICATION

This application claims benefit of U.S. Provisional Patent Application Ser. No. 62/184,983, filed Jun. 26, 2015, the entirety of which is herein incorporated by reference.

BACKGROUND

Field

Embodiments of the disclosure relate to spherical bearings.

Description of the Related Art

Bearings, such as plain bearings, ball bearings, roller bearings, and needle bearings, are used in various devices to reduce friction between components of the device that rotate relative to each other, which reduces power consumption and wear of the device. There are two types of bearings, plain, and roller. Plain bearings rely on the properties of the materials used to form the bearing and lubricant film properties to reduce friction, while roller bearings rely on the configuration of the bearing rolling elements and races to reduce friction.

A roller bearing includes two rings and rolling elements positioned between the rings. Examples of rolling elements include hard metal balls in the case of ball bearings, and metal rollers in the case of roller bearings. Reduced friction is achieved by using rolling instead of sliding action. Any sliding still present is mitigated by using an appropriate lubricant and cage design.

Generally, the greater the number of rolling elements used, the greater the load capacity the roller bearing can handle. Alignment and separation of the rolling elements becomes more important as the number of rolling elements in a bearing increase. Thus, a cage is used to maintain roller element alignment and separation.

There is a continuing need for bearing designs that reduce friction and increase bearing load capacity.

SUMMARY

In one embodiment, a roller bearing comprises an inner ring, an outer ring, and a bearing cage positioned between the inner ring and the outer ring. The bearing cage includes a spine and a plurality of pins disposed one side of the spine that are coplanar with a plurality of pins disposed on an opposite side of the spine. A roller is rotationally coupled to each pin such that each roller is coplanar with another roller on the opposite side of the spine.

In another embodiment, a roller bearing comprises an inner ring, an outer ring, and a bearing cage positioned between the inner ring and the outer ring. The bearing cage includes a spine and a pin component inserted into an opening formed in the spine, wherein the pin component includes at least one pin. A roller is rotationally coupled to the pin.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numerals have been used, where applicable, to designate identical elements that are common between figures. Additionally, elements of one embodiment may be advantageously adapted for utilization in other embodiments described herein.

DETAILED DESCRIPTION

Figure 1:
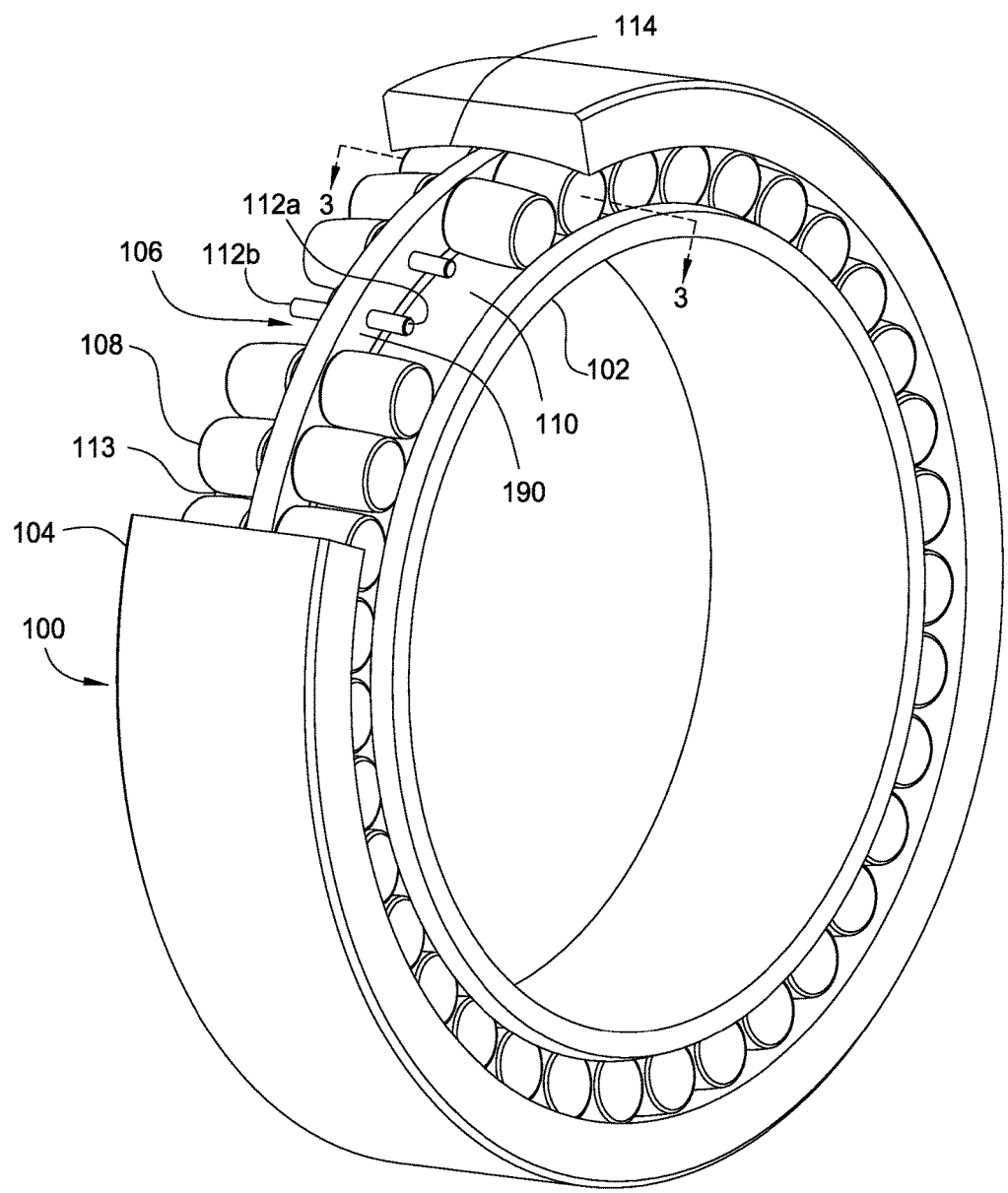
FIG. 1 illustrates a roller bearing, according to one embodiment disclosed herein.

FIG. 1 illustrates a bearing 100, according to one embodiment. The bearing 100 includes an inner ring 102, an outer ring 104, and a bearing cage 106 disposed between the inner ring 102 and the outer ring 104. As shown in FIG. 1, a portion of the outer ring 104 has been removed to illustrate the internal components of the bearing 100. The inner ring 102 is concentric with the outer ring 104. The bearing cage 106 is concentric with both the inner ring 102 and the outer ring 104.

Figure 3:
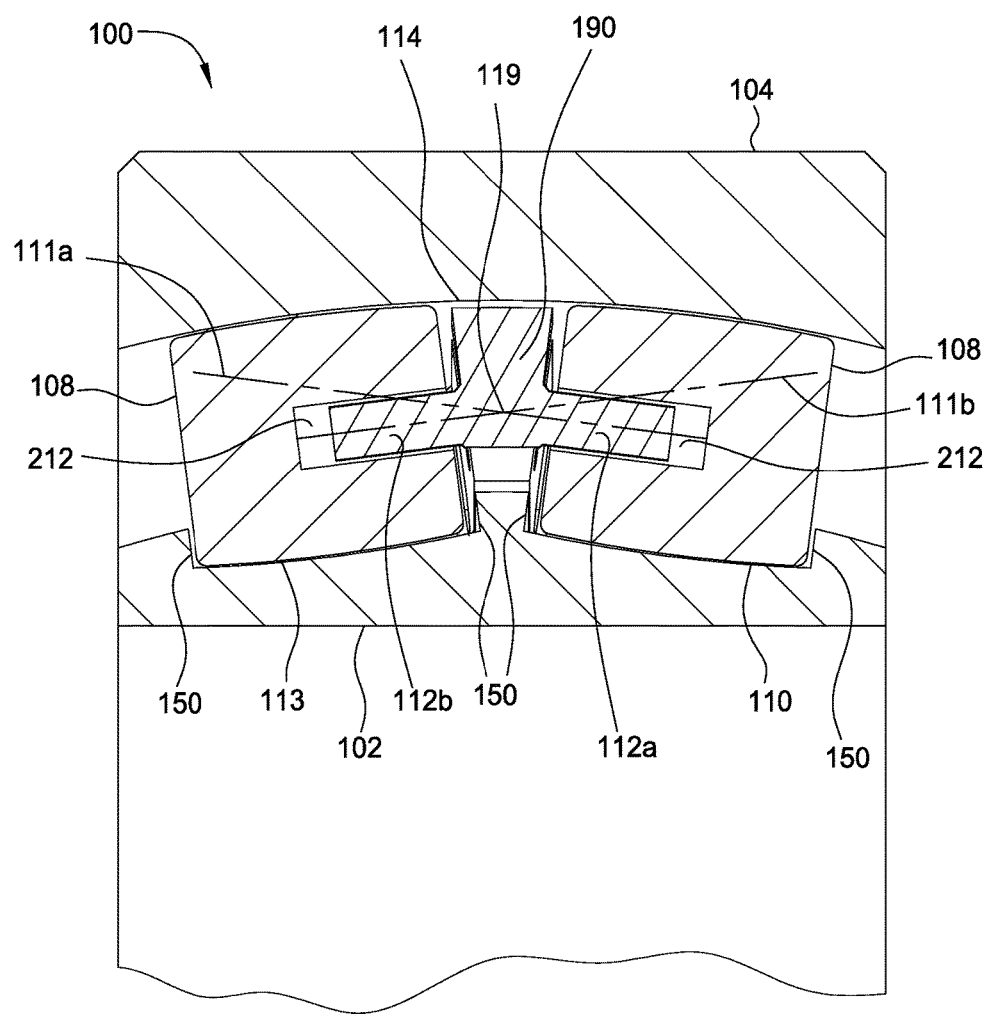
FIG. 3 illustrates a cross-sectional view of the roller bearing of FIG. 1, according to one embodiment disclosed herein.

The bearing cage 106 includes a spine 190, a plurality of pins 112a disposed on one side of the spine 190, and a plurality of 112b disposed on an opposite side of the spine 190. The pins 112a, 112b may be individual pieces that are coupled (e.g. welded, threaded, or interference fit) to the spine 190, or alternatively, the pins 112a, 112b may be integrally formed with the spine 190 as a single piece. A center axis 111a of each pin 112a is coplanar with a center axis 111b of a corresponding pin 112b disposed on the opposite side of the spine 190, such that the center axis 111a of each pin 112a intersects with the center axis 111b of each corresponding pin 112b at a point 119 (as shown in FIG. 3). Each pin 112a, 112b is configured to support a roller 108. As shown in FIG. 1, three rollers 108 have been removed to illustrate the pins 112a, 112b.

Each roller 108 is rotationally coupled to one of the pins 112a, 112b. The rollers 108 are disposed between the inner ring 102 and the outer ring 104. The rollers 108 are positioned adjacent to each other and roll along raceways, which are the contact surfaces between the rollers 108 and the inner ring 102 and the outer ring 104, respectively.

As shown in FIGS. 1 and 3, one raceway 114 is formed by the curved inner surface of the outer ring 104. As further shown in FIGS. 1 and 3, two raceways 110, 113 are formed by two separate grooves formed in the outer surface of the inner ring 102. One or more lips 150 (such as the edges of the raceways 110, 113) are configured to guide and/or retain the rollers 108 within the raceways 110, 113. The rollers 108 may slide or roll against the lips 150 as the rollers 108 move along the raceways 110, 113. Although one raceway 114 is shown on the outer ring 104, and two raceways 110, 113 are shown on the inner ring 102, either of the outer ring 104 or the inner ring 102 may have one or two raceways. When the bearing 100 is assembled, the inner ring 102 and the outer ring 104 can rotate relative to each other.

Figure 2:
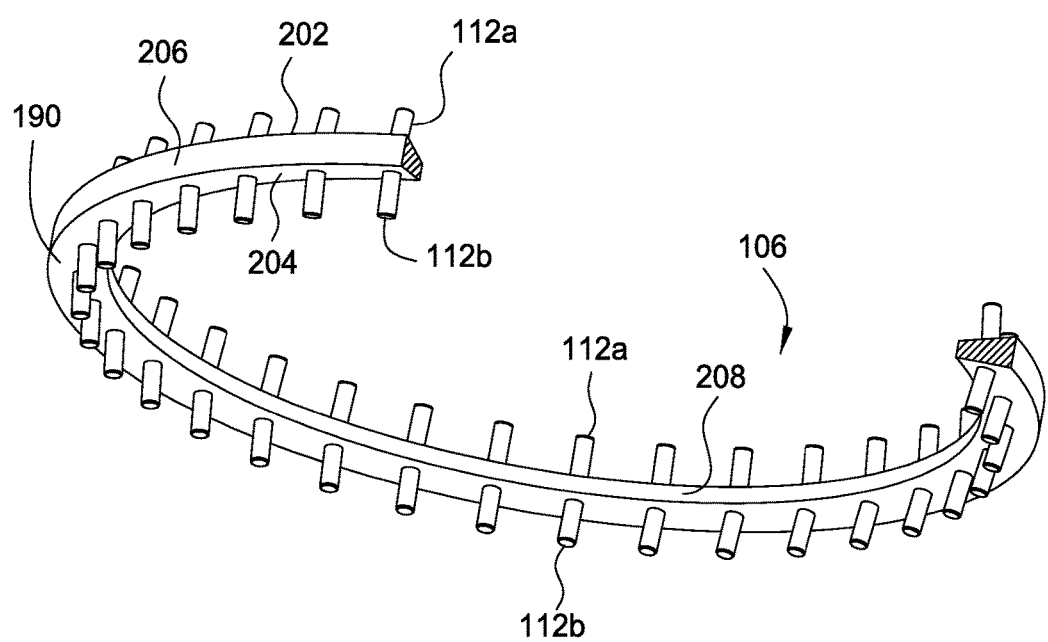
FIG. 2 illustrates a bearing cage of the bearing of FIG. 1, according to one embodiment disclosed herein.

FIG. 2 illustrates the bearing cage 106, according to one embodiment. As shown in FIG. 2, a portion of the bearing cage 106 is removed to illustrate the cross section profile. The bearing cage 106 includes the spine 190 having a ring-shaped body with opposing side faces 202, 204, an outer face 206, and an inner face 208. The body of the spine 190 has a quadrilateral-shaped cross section. In the embodiment shown in FIG. 2, the spine 190 has a trapezoidal-shaped cross section, where the length of the inner face 208 is less than the length of the outer face 206 such that the side faces 202, 204 are sloped from the inner face 208 to the outer face 206. The pins 112a are coupled to and perpendicular to the side face 202, and the pins 112b are coupled to and perpendicular to the side face 204.

FIG. 3 illustrates a cross-sectional view of the bearing 100 taken along reference line 3-3 of FIG. 1, according to one embodiment. As shown in FIG. 3, each roller 108 includes a hole 212 within which one of the pins 112a, 112b is inserted to couple the roller 108 to the spine 109 of the bearing cage 106. In one embodiment, the length of each pin 112a, 112b is shorter than the depth of each hole 212. In another embodiment, the length of each pin 112a, 112b is longer than the depth of each hole 212.

The center axis 111a of each pin 112a being coplanar with the center axis 111b of a corresponding pin 112b results in each roller 108 being coplanar with a corresponding roller 108 on the opposite side. More rollers 108 increase surface contact area with the inner ring 102 and the outer ring 104, which increases the load capacity of the bearing 100.

Figure 4:
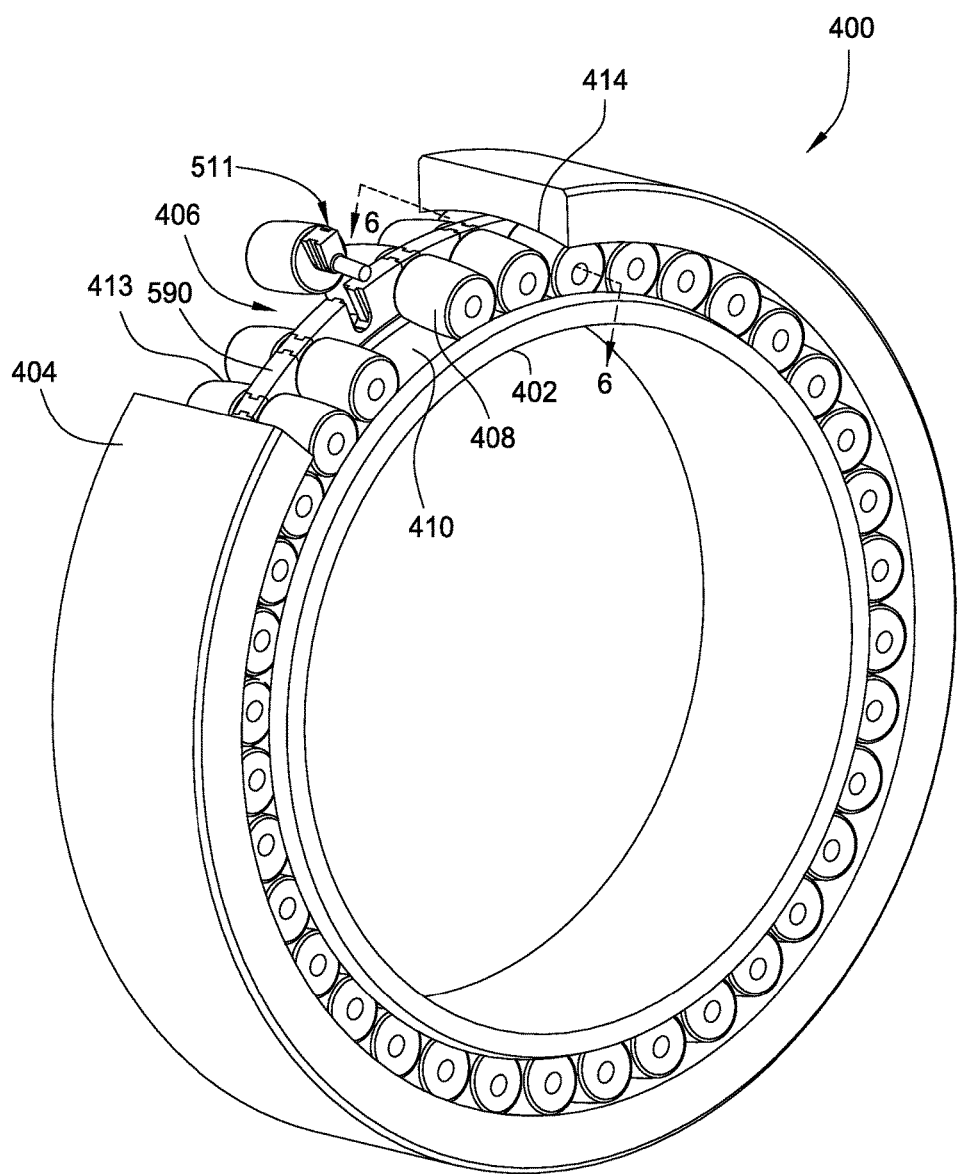
FIG. 4 illustrates another roller bearing, according to one embodiment disclosed herein.

FIG. 4 illustrates a bearing 400, according to one embodiment. The bearing 400 includes an inner ring 402, an outer ring 404, and a bearing cage 406 disposed between the inner ring 402 and the outer ring 404. As shown in FIG. 4, a portion of the outer ring 404 has been removed to illustrate the internal components of the bearing 400. The inner ring 402 is concentric with the outer ring 404, and the bearing cage 406 is concentric with both the inner ring 402 and the outer ring 404. The bearing cage 406 locates a plurality of rollers 408 between the inner ring 402 and the outer ring 404 via one or more pin components 511 as further described below.

Figure 5A:
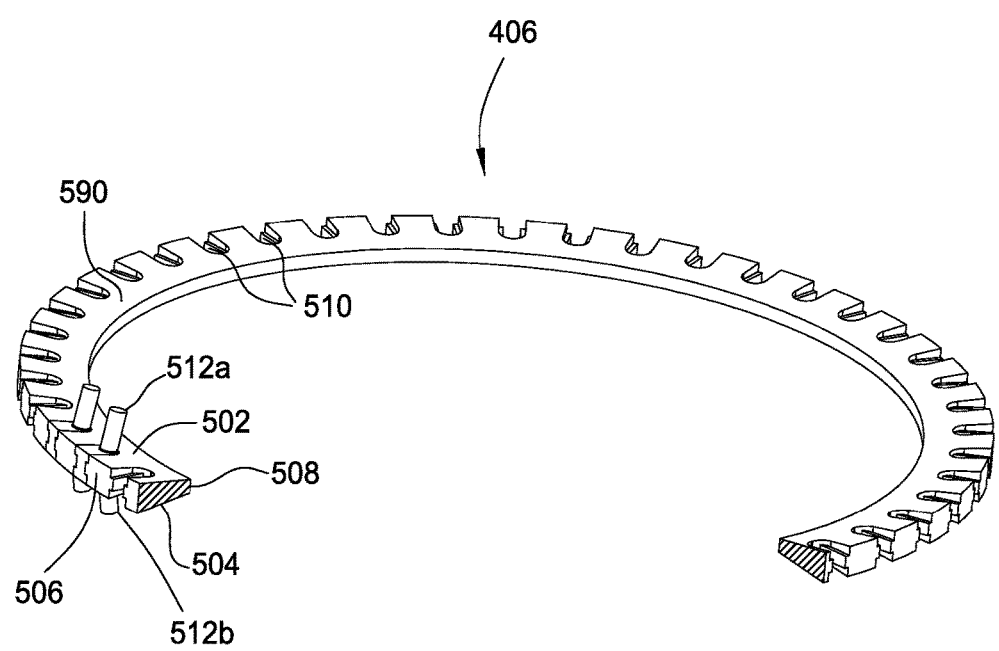
FIG. 5A illustrates a bearing cage of the roller bearing of FIG. 4, according to one embodiment disclosed herein.

FIG. 5A illustrates the bearing cage 406, according to one embodiment. As shown in FIG. 5, a portion of the bearing cage 406 is removed to illustrate the cross section profile. The bearing cage 406 includes a spine 590 having a ring-shaped body with opposing side faces 502, 504, an outer face 506, and an inner face 508. The body of the spine 590 has a quadrilateral-shaped cross section. In the embodiment shown in FIG. 5A, the body of the spine 590 of the bearing cage 406 has a trapezoidal-shaped cross section, where the length of the inner face 508 is less than the length of the outer face 506 such that the side faces 502, 504 are sloped from the inner face 508 to the outer face 506.

Figure 5B:
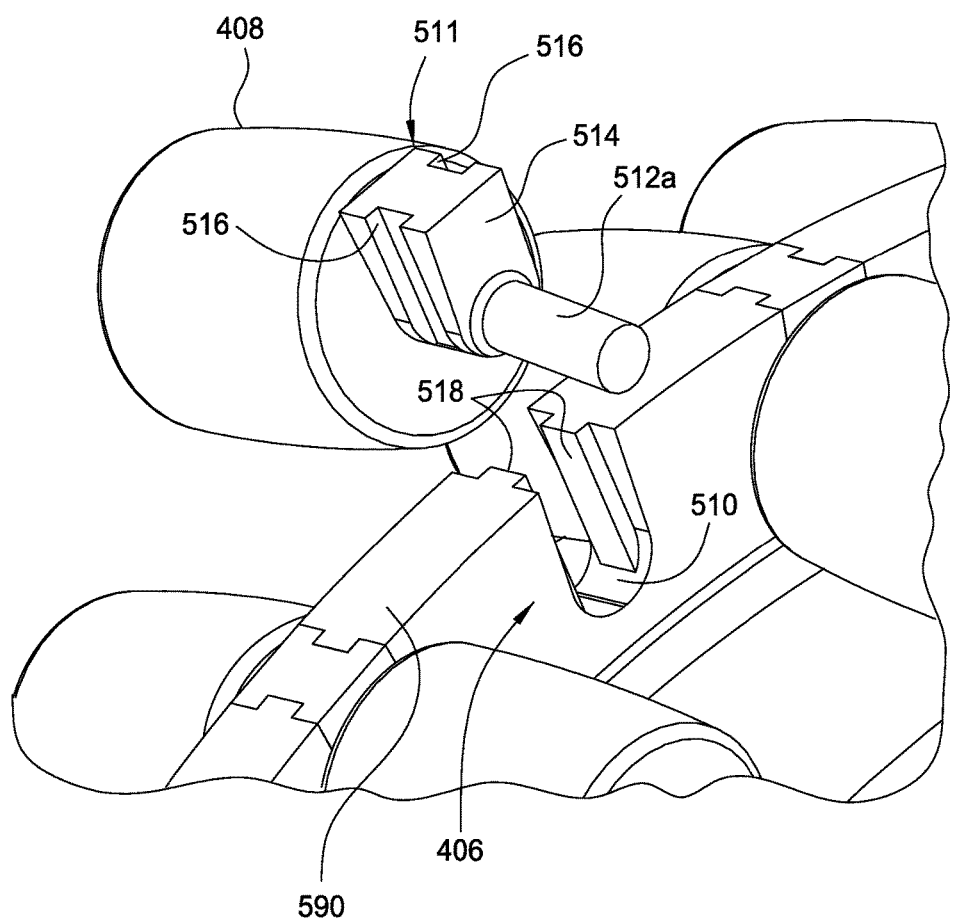
FIG. 5B illustrates an enlarged view of a portion of the bearing cage of the roller bearing of FIG. 4, according to one embodiment disclosed herein.
Figure 6:
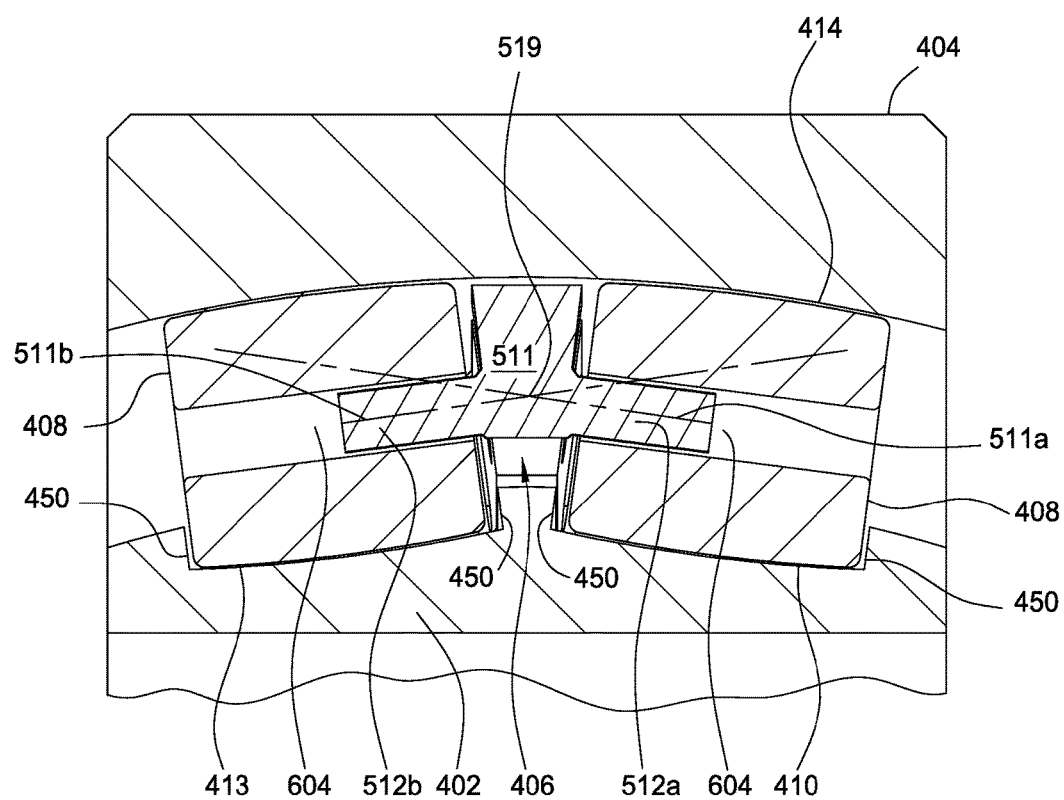
FIG. 6 illustrates a cross-sectional view of the roller bearing of FIG. 4, according to one embodiment disclosed herein.

Referring to FIGS. 5A and 5B, the spine 590 includes a plurality of openings 510 within which a pin component 511 of the bearing cage 406 is inserted. The pin component 511 includes a base member 514, a first pin 512a coupled to the base member 514, and a second pin 512b coupled to the base member 514. A center axis 511b of each second pin 512b is coplanar with a center axis 511a of each corresponding first pin 512a disposed on the opposite side of the base member 514 such that the center axis 511a intersects with the center axis 511b at a point 519 (as shown in FIG. 6). The pins 512a, 512b may be individual pieces that are coupled (e.g. welded, threaded, or interference fit) to the base member 514, or alternatively, the pins 512a, 512b may be integrally formed with the base member 514 as a single piece. When the pin components 511 are coupled to the spine 590, each pin 512a is coplanar with a pin 512b on the opposite side.

The pin component 511 may be releasably coupled to the bearing cage 406 by a tongue and groove connection. For example, the base member 514 may include one or more grooves 516 configured to mate with one or more tongues 518 formed in each opening 510 of the spine 590 to secure the pin component 511 in the opening 510. In one embodiment, as shown in FIG. 5B, the base member 514 comprises an I-shaped or H-shaped body having two opposing grooves 516 that mate with corresponding tongues 518 formed in each opening 510 to secure the pin component 511 to the spine 590 of the bearing cage 406. Each pin component 511 can be inserted into and removed from each opening 510 formed in the spine 590 to couple the rollers 408 to the bearing cage 406. In an alternative embodiment, the base member 514 may include tongues (similar to tongues 518) and the opening 510 may include corresponding grooves (similar to grooves 516) that mate with the tongues to couple the base member 514 to the bearing cage 406. In an alternative embodiment, the pin component 511 may be releasably coupled to the spine 590 via any other type of connection, such as by a threaded connection or interference fit.

Each pin 512a, 512b is configured to support one roller 408. The rollers 408 are rotationally coupled to the pins 512a, 512b and are disposed between the inner ring 402 and the outer ring 404. The rollers 408 are positioned adjacent to each other and roll along raceways, which are the contact surfaces between the rollers 408 and the inner ring 402 and the outer ring 404, respectively.

As shown in FIGS. 4 and 6, one raceway 414 is formed by the curved inner surface of the outer ring 404. As further shown in FIGS. 4 and 6, two raceways 410, 413 are formed by two separate grooves formed in the outer surface of the inner ring 402. One or more lips 450 (such as the edges of the raceways 410, 413) are configured to guide and/or retain the rollers 408 within the raceways 410, 413. The rollers 408 may slide or roll against the lips 450 as the rollers 408 move along the raceways 410, 413. Although one raceway 414 is shown on the outer ring 404, and two raceways 410, 413 are shown on the inner ring 402, either of the outer ring 404 or the inner ring 402 may have one or two raceways.

FIG. 6 illustrates a cross-sectional view of the bearing 400 taken along reference line 6-6 of FIG. 4, according to one embodiment. As shown, each roller 408 is hollow and includes a hole 604 that extends through the roller 408 within which one of the pins 512a, 512b of the pin component 511 is inserted to couple the roller 408 to the bearing cage 406. In one embodiment, the length of each pin 512a, 512b is shorter than the depth of each hole 604. In another embodiment, the length of each pin 512a, 512b is longer than the depth of each hole 604. When the bearing 400 is assembled, the inner ring 402 and the outer ring 404 can rotate relative to each other.

The rollers 408 are coplanar since the center axis 511a of each pin 512a locating one roller 408 is coplanar with and intersects the center axis 511b of a corresponding pin 512b locating another roller 408 on the opposite side. Because the two rows of rollers 408 are coplanar such that the center axes of opposing rollers 408 intersect, as opposed to being offset, more rollers 408 can be positioned between the inner ring 402 and the outer ring 404. More rollers 408 increase surface contact area with the inner ring 402 and the outer ring 404 and increases the load capacity of the bearing 400.

Figure 7:
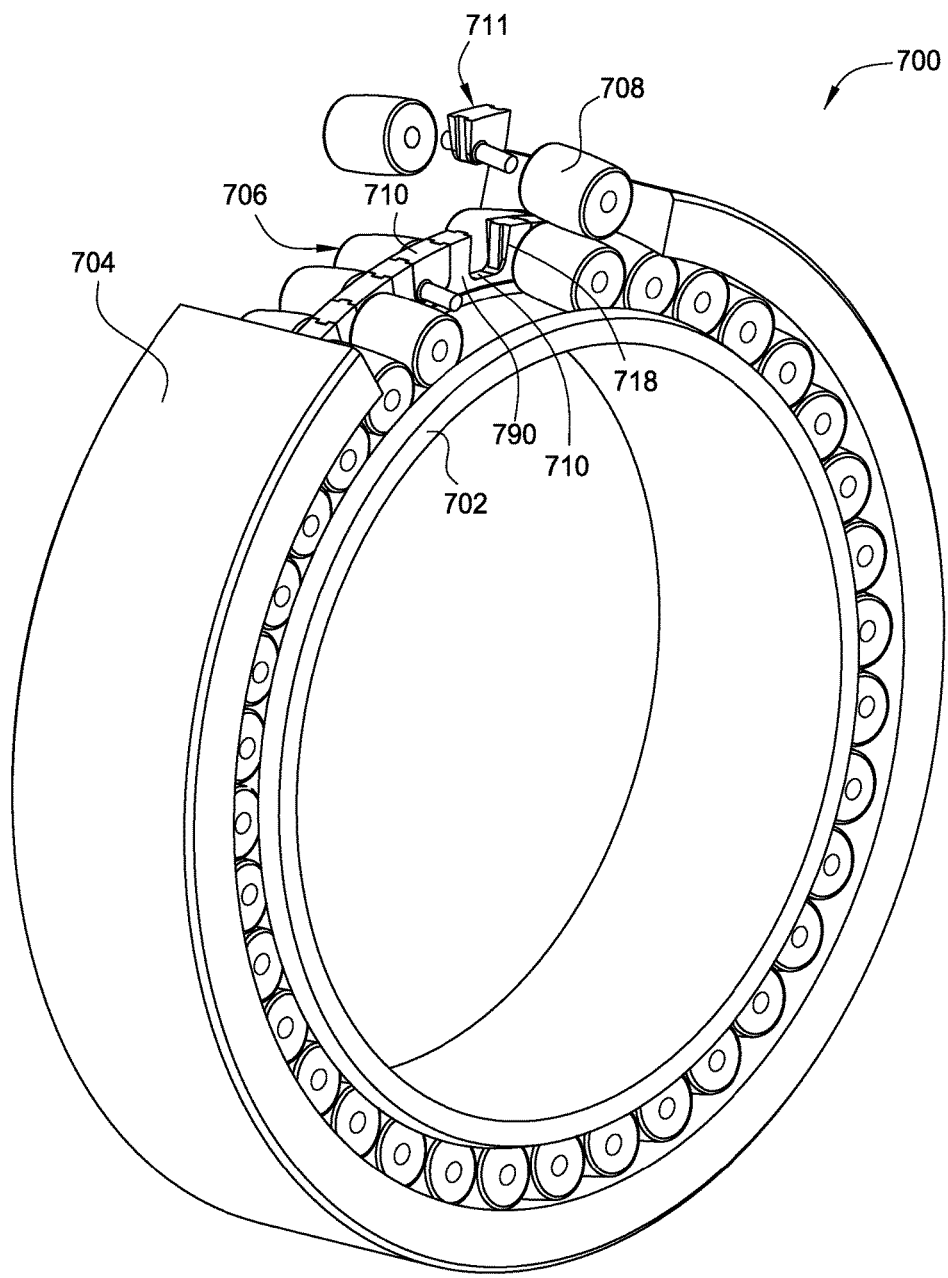
FIG. 7 illustrates another roller bearing, according to one embodiment disclosed herein.

FIG. 7 illustrates a bearing 700, according to one embodiment. The bearing 700 includes an inner ring 702, an outer ring 704, and a bearing cage 706 disposed between the inner ring 702 and the outer ring 704. As shown in FIG. 7, a portion of the outer ring 704 has been removed to illustrate the internal components of the bearing 700. The inner ring 702 is concentric with the outer ring 704, and the bearing cage 706 is concentric with both the inner ring 702 and the outer ring 704. The bearing cage 706 includes a plurality of rollers 708 disposed between the inner ring 702 and the outer ring 704 via one or more pin components 711. The bearing cage 706 is substantially similar to the bearing cage 406 in FIG. 5A, and includes a spine 790 having a plurality of openings 710 within which a pin component 711 of the bearing cage 706 is inserted via a tongue and groove or other similar type of connection to couple the rollers 708 to the spine 790.

Figure 8:
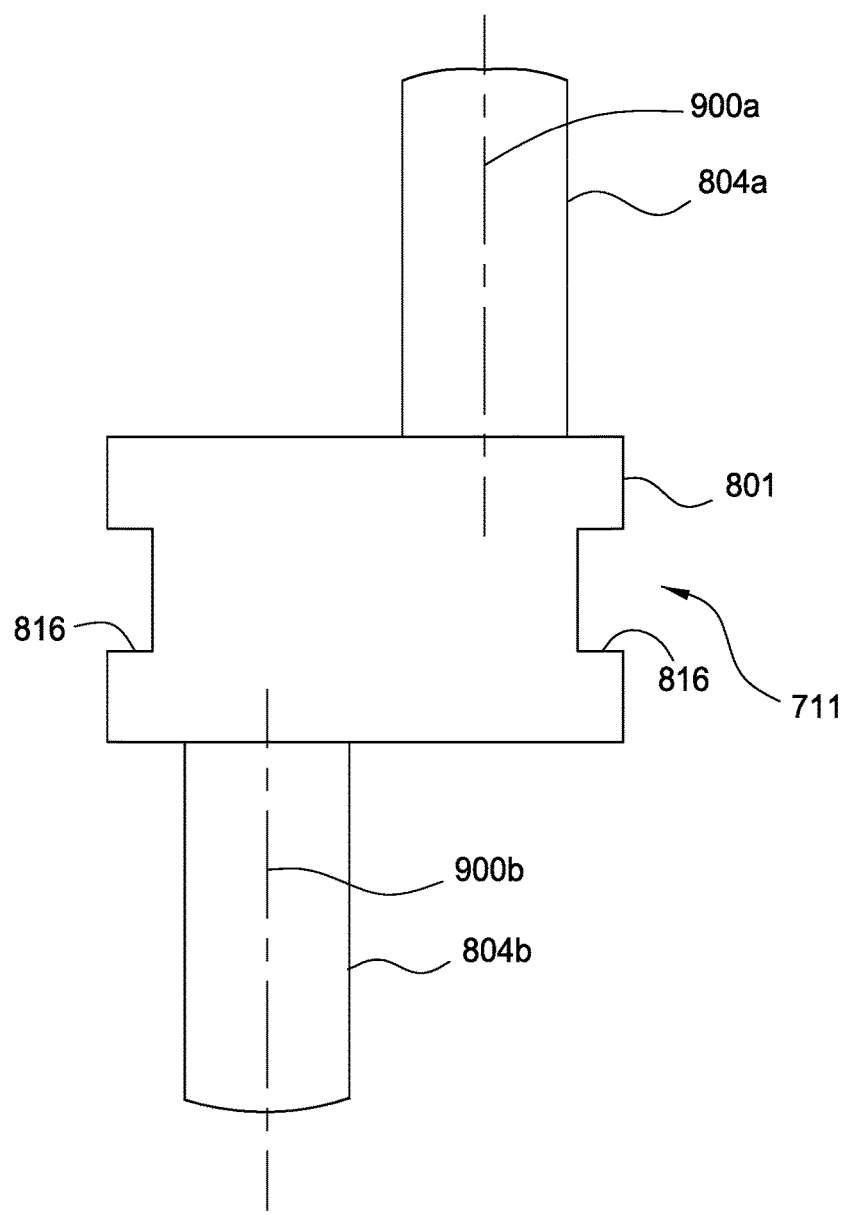
FIG. 8 illustrates an enlarged view of a pin component, according to one embodiment disclosed herein.

FIG. 8 illustrates a top view of the pin component 711. The pin component 711 includes a base member 801, a first pin 804a coupled to the base member 801, and a second pin 804b coupled to the base member 801. The base member 801 comprises an I-shaped or H-shaped body having two opposing grooves 816 that mate with corresponding tongues 718 (shown in FIG. 7) formed in each opening 710 of the spine 790 to secure the pin component 711 to the spine 790 of the bearing cage 706. A center axis 900a of each first pin 804a is offset from a center axis 900b of each corresponding second pin 804b disposed on the opposite side of the base member 801. The pins 804a, 804b may be individual pieces that are coupled (e.g. welded, threaded, or interference fit) to the base member 801, or alternatively, the pins 804a, 804b may be integrally formed with the base member 801 as a single piece. When the pin components 711 are coupled to the spine 790, each pin 804a is offset from the pin 804b on the opposite side.

Figure 9:
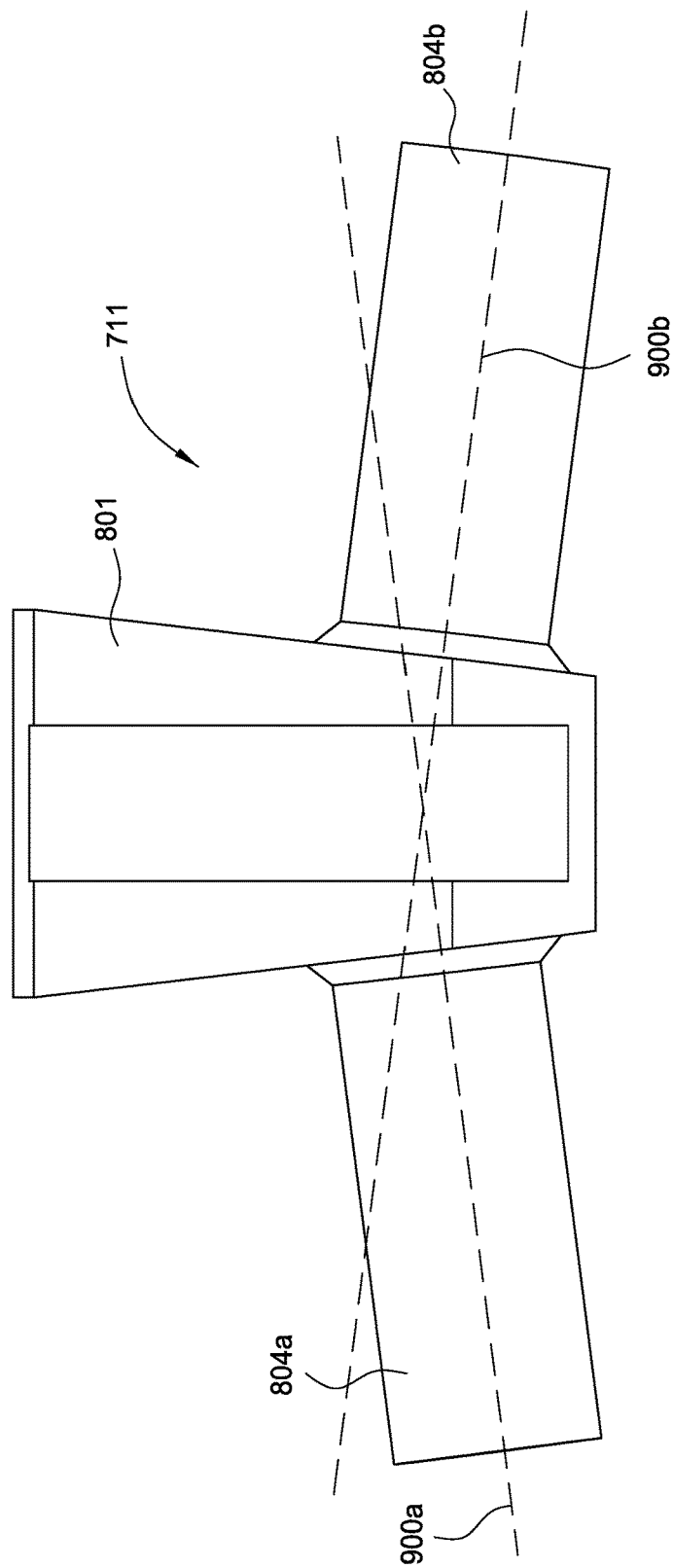
FIG. 9 illustrates a side view of the pin component of FIG. 8, according to one embodiment disclosed herein.

FIG. 9 illustrates a side view of the pin component 711. The first and second pins 804a, 804b are coupled to the side faces of the base member 801 such that the center axis 900b of each second pin 804b is skewed or positioned at an angle relative to the center axis 900a of each first pin 804a.

Figure 10:
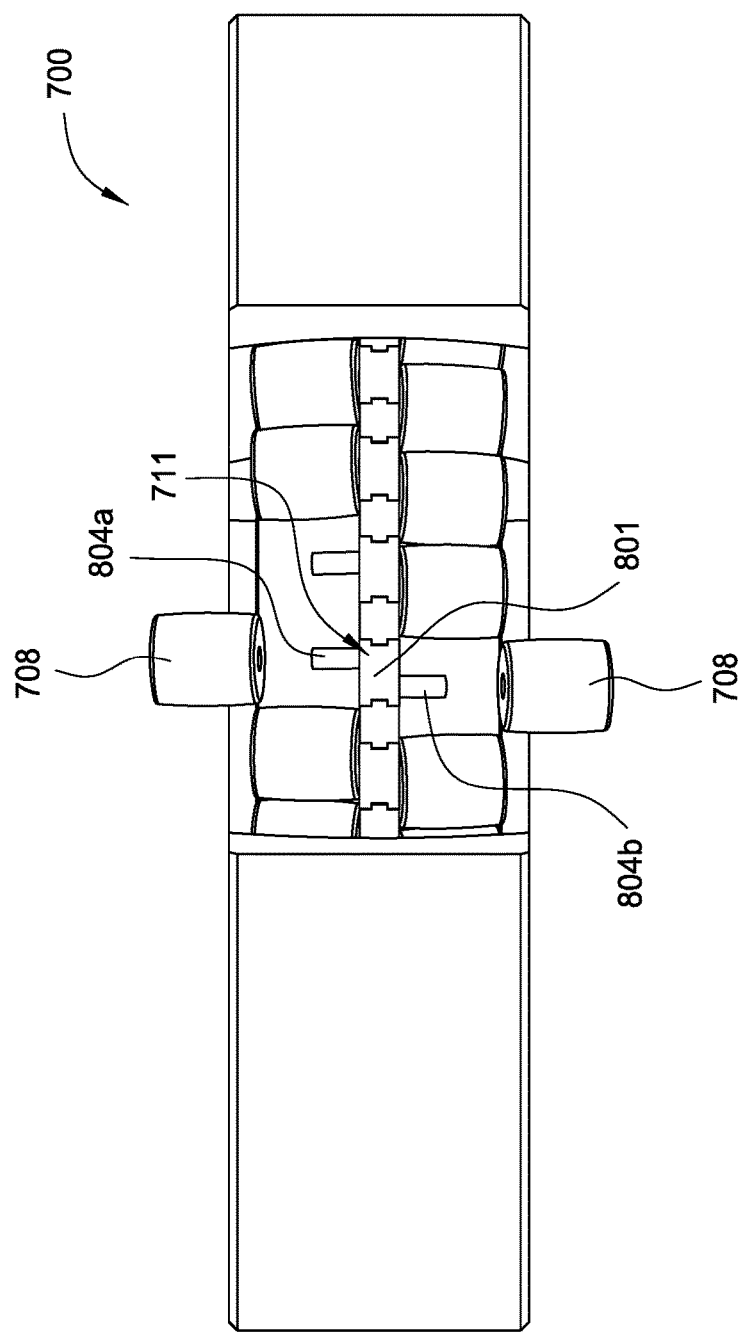
FIG. 10 illustrates a top view of the roller bearing of FIG. 7, according to one embodiment disclosed herein.

FIG. 10 illustrates a top view of the bearing 700 of FIG. 7, according to one embodiment. As shown, the rollers 708 are offset because the center axis 900a of each first pin 804a locating one roller 708 is offset with the center axis 900b of each second pin 804b locating another roller 708 on the opposite side of each base member 801.

In another embodiment, each pin component 710 may only include one pin on one side of the base member 701 such that the location of the pin on the base member 701 alternates along the spine of the bearing cage 706. As a result, the pins along one side of the spine are set off from the pins along the opposite side. Therefore, the center axis of each pin on the first side of the base member 701 is skew with the center axis of each pin on the second side of the base member 701.

Figure 11:
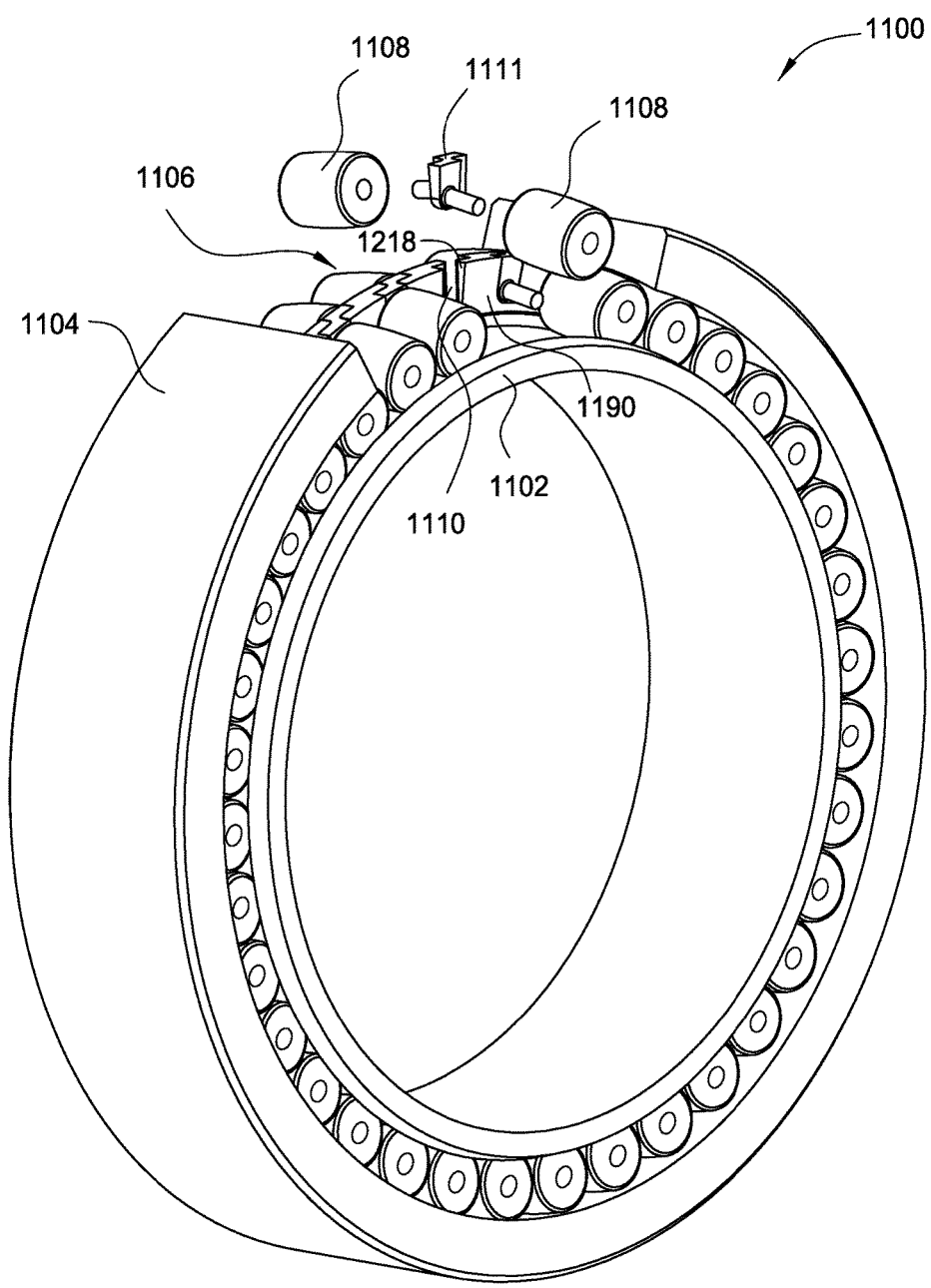
FIG. 11 illustrates another roller bearing, according to one embodiment disclosed herein.

FIG. 11 illustrates a bearing 1100, according to one embodiment. The bearing 1100 includes an inner ring 1102, an outer ring 1104, and a bearing cage 1106 disposed between the inner ring 1102 and the outer ring 1104. As shown in FIG. 11, a portion of the outer ring 1104 has been removed to illustrate the internal components of the bearing 1100. The inner ring 1102 is concentric with the outer ring 1104, and the bearing cage 1106 is concentric with both the inner ring 1102 and the outer ring 1104. The bearing cage 1106 includes a plurality of rollers 1108 disposed between the inner ring 1102 and the outer ring 1104 via one or more pin components 1111. The bearing cage 1106 is substantially similar to the bearing cage 406 in FIG. 5A, and includes a spine 1190 having a plurality of openings 1110 within which a pin component 1111 of the bearing cage 1106 is inserted via a tongue and groove or other similar type of connection to couple the rollers 1108 to the spine 1190.

Figure 12:
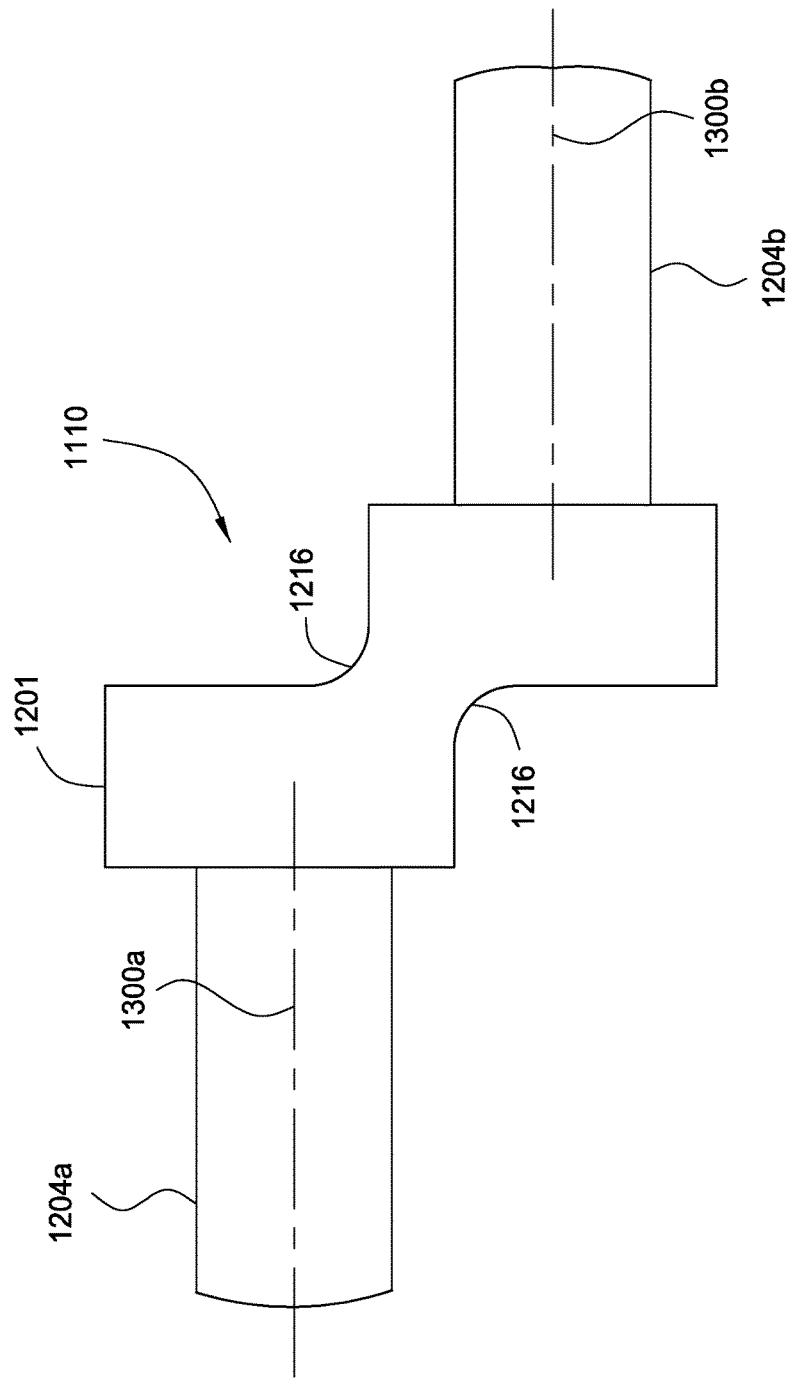
FIG. 12 illustrates an enlarged view of a pin component, according to one embodiment disclosed herein.

FIG. 12 illustrates a top view of the pin component 1111. The pin component 1111 includes a base member 1201, a first pin 1204a coupled to the base member 1201, and a second pin 1204b coupled to the base member 1201. The base member 1201 comprises an S-shaped or Z-shaped body having two opposing grooves 1216 that mate with corresponding tongues 1218 (shown in FIG. 11) formed in each opening 1110 of the spine 1190 to secure the pin component 1111 to the spine 1190 of the bearing cage 1106. A center axis 1300a of each first pin 1204a is offset from a center axis 1300b of each corresponding second pin 1204b disposed on the opposite side of the base member 1201. The pins 1204a, 1204b may be individual pieces that are coupled (e.g. welded, threaded, or interference fit) to the base member 1201, or alternatively, the pins 1204a, 1204b may be integrally formed with the base member 1201 as a single piece. When the pin components 1111 are coupled to the spine 1190, each pin 1204a is offset from the pin 1204b on the opposite side.

Figure 13:
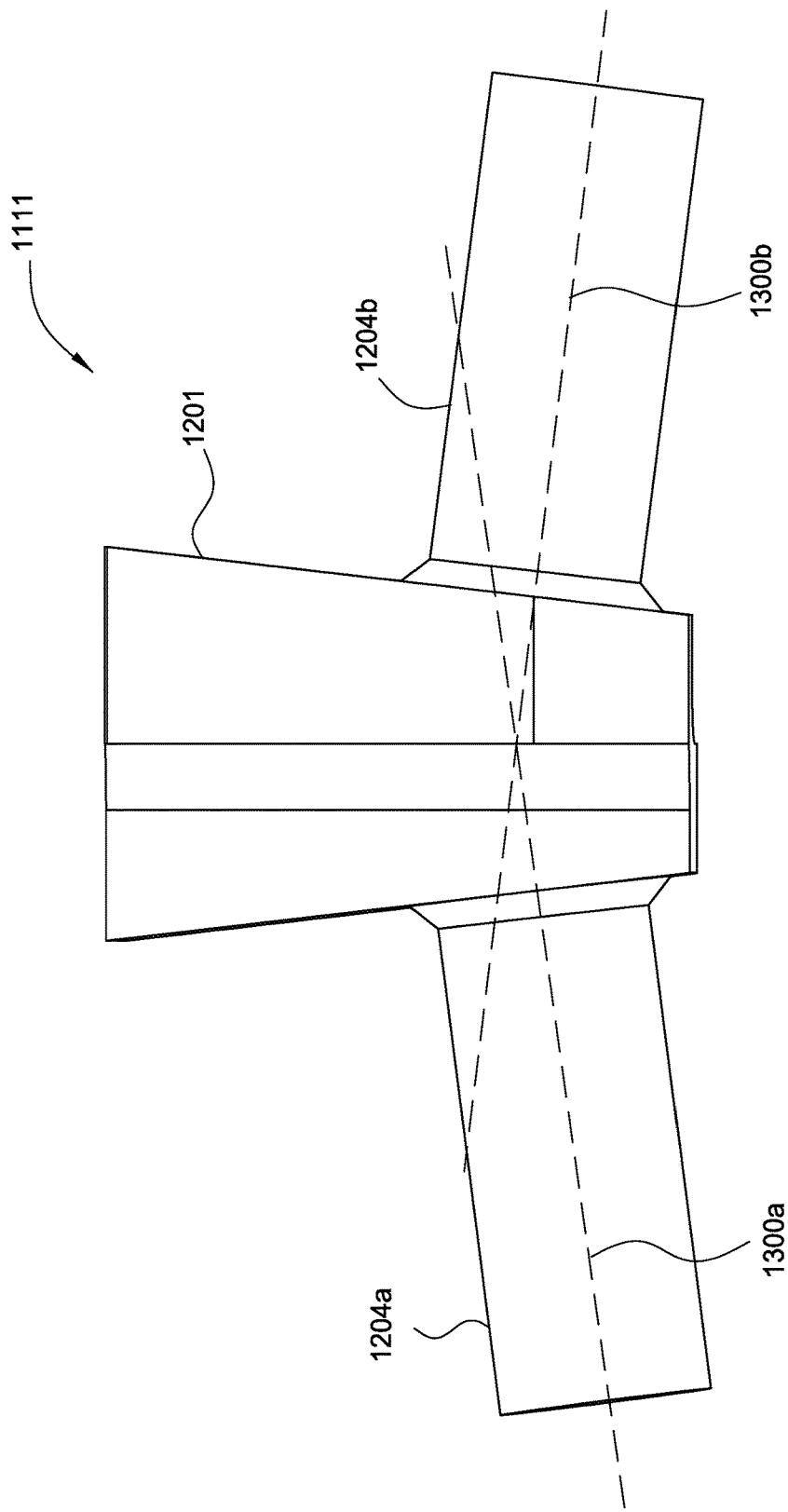
FIG. 13 illustrates a side view of the pin component of FIG. 12, according to one embodiment disclosed herein.

FIG. 13 illustrates a side view of the pin component 1111. The first and second pins 1204a, 1204b are coupled to the side faces of the base member 1201 such that the center axis 1300b of each second pin 1204b is skewed or positioned at an angle relative to the center axis 1300a of each first pin 1204a.

Figure 14:
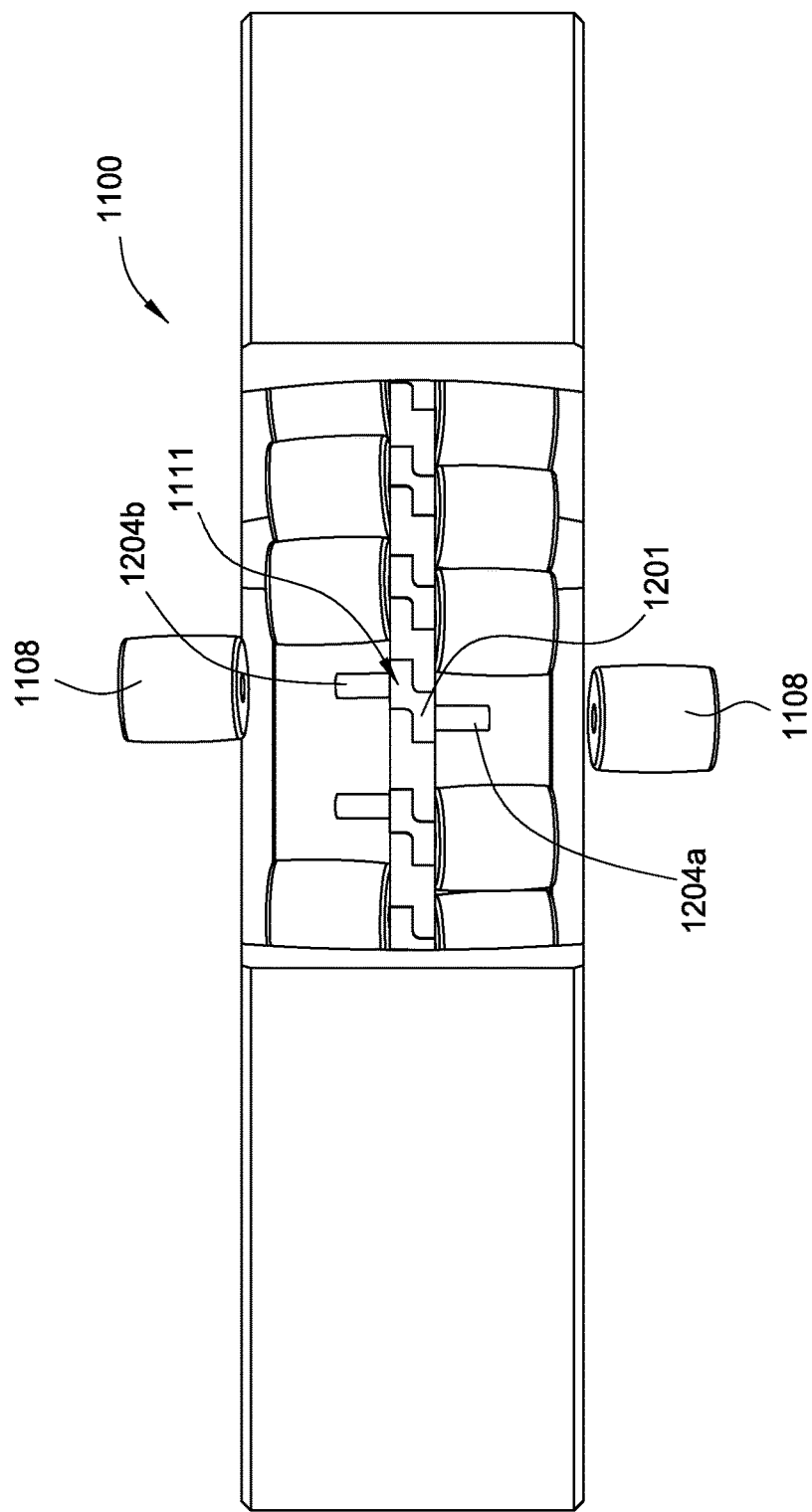
FIG. 14 illustrates a top view of the roller bearing of FIG. 11, according to one embodiment disclosed herein.

FIG. 14 illustrates a top view of the bearing 1100 of FIG. 11, according to one embodiment. As shown, the rollers 1108 are offset because the center axis 1300a of each first pin 1204a locating one roller 1108 is offset with the center axis 1300b of each second pin 1204b locating another roller 1108 on the opposite side of each base member 1201.

Other and further embodiments may be devised without departing from the basis scope thereof, and the scope thereof is determined by the claims that follow.

The invention claimed is:

1. A roller bearing, comprising:
   an inner ring;
   an outer ring;
   a bearing cage positioned between the inner ring and the outer ring, wherein the bearing cage includes a spine and a plurality of pins disposed one side of the spine that are coplanar with a plurality of pins disposed on an opposite side of the spine, wherein the pins are part of a pin component that connects the rollers to the spine, wherein the pin component is inserted into an opening formed in the spine to connect the rollers to the spine, wherein the pin component comprises a base member, wherein one pin is coupled to one side of the base member and another pin is coupled to an opposite side of the base member, and wherein the base member is coupled to the spine by a tongue and groove connection; and a roller rotationally coupled to each pin such that each roller is coplanar with another roller on the opposite side of the spine.

2. The roller bearing of claim 1, wherein the pins are separate components that are coupled to the spine.

3. The roller bearing of claim 1, wherein the tongue and groove connection comprises one or more grooves formed in the base member that mate with one or more tongues formed in the opening of the spine.

4. The roller assembly of claim 1, wherein the spine has a trapezoidal shaped cross-section.

5. The roller assembly of claim 1, wherein the bearing cage is concentric with the inner ring and the outer ring.

6. The roller assembly of claim 1, wherein the rollers are hollow and have a hole formed through each roller within which the pins are inserted to couple the roller to the spine.

7. The roller bearing of claim 1, wherein a center axis of each pin disposed on the one side of the spine is coplanar with a center axis of a corresponding pin disposed on the opposite side of the spine such that the center axis of each pin intersects with the center axis of the corresponding pin.

8. A roller bearing, comprising:
an inner ring;
an outer ring;
a bearing cage positioned between the inner ring and the outer ring, wherein the bearing cage includes a spine and a pin component inserted into an opening formed in the spine, wherein the pin component includes at least one pin, wherein the pin component further includes another pin disposed on an opposite side of the pin component from the one pin, wherein the pin component comprises a base member, wherein one pin is coupled to one side of the base member and the other pin is coupled to an opposite side of the base member, and wherein the base member has an S-shaped or Z-shaped body; and
a roller rotationally coupled to the pin.

9. The roller bearing of claim 8, wherein the pins are coplanar relative to each other.

10. The roller bearing of claim 9, wherein a center axis of the pin disposed on the one side of the pin component is coplanar with and intersects a center axis of the other pin disposed on the opposite side of the pin component.

11. The roller bearing of claim 8, wherein the pins are offset relative to each other.

12. The roller bearing of claim 11, wherein a center axis of the pin disposed on the one side of the pin component is offset and skewed relative to a center axis of the other pin disposed on the opposite side of the pin component.

13. A roller bearing, comprising:
an inner ring;
an outer ring;
a bearing cage positioned between the inner ring and the outer ring, wherein the bearing cage includes a spine and a pin component inserted into an opening formed in the spine, wherein the pin component includes at least one pin, wherein the pin component further includes another pin disposed on an opposite side of the pin component from the one pin, wherein the pin component comprises a base member, wherein one pin is coupled to one side of the base member and the other pin is coupled to an opposite side of the base member, and wherein the base member has an I-shaped or H-shaped body; and
a roller rotationally coupled to the pin.

14. The roller bearing of claim 13, wherein the pins are coplanar relative to each other.

15. The roller bearing of claim 14, wherein a center axis of the pin disposed on the one side of the pin component is coplanar with and intersects a center axis of the other pin disposed on the opposite side of the pin component.

16. The roller bearing of claim 13, wherein the pins are offset relative to each other.

17. The roller bearing of claim 16, wherein a center axis of the pin disposed on the one side of the pin component is offset and skewed relative to a center axis of the other pin disposed on the opposite side of the pin component.

* * * * *